United States Patent [19]

Staut

[11] 3,753,747
[45] Aug. 21, 1973

[54] HYDRATION RESISTANCE FOR DOLOMITE GRAIN

[75] Inventor: Ronald Staut, Cherry Hill, N.J.

[73] Assignee: General Refractories Company, Philadelphia, Pa.

[22] Filed: Oct. 1, 1971

[21] Appl. No.: 185,869

[52] U.S. Cl. .................... 106/58, 106/61, 106/62, 106/63
[51] Int. Cl. .................... C04b 35/04, C04b 35/06
[58] Field of Search .................... 106/61, 58, 62, 63

[56] References Cited
UNITED STATES PATENTS

| | | | |
|---|---|---|---|
| 3,304,188 | 2/1967 | Hughey | 106/61 |
| 2,245,297 | 6/1941 | Pitt et al. | 106/61 |
| 2,517,790 | 8/1950 | Hughey | 106/61 |

Primary Examiner—James E. Poer
Attorney—Ford F. Farabow, Brian G. Brunsvold et al.

[57] ABSTRACT

The hydration resistance of a low-flux CaO · MgO refractory is increased by incorporating at least 0.01 percent by weight of a stabilizing agent selected from the group consisting of $Al_2O_3$, $V_2O_5$, aluminum fluoride, $MgF_2$, and $CaF_2$, and mixtures thereof to increase the total content of the stabilizing agent in the refractory grain to from 0.01 percent to about 1.0 percent by weight.

10 Claims, No Drawings

HYDRATION RESISTANCE FOR DOLOMITE GRAIN

This invention relates to improving the hydration resistance of a high purity CaO · MgO refractory grain. Most particularly, the invention relates to a process for producing hydration resistant and nearly theoretically dense dolomite grain from a mixture of oxides containing at least 98 percent CaO · MgO.

Burned dolomite is an attractive steel making refractory material because of the high melting point of the CaO · MgO mixture. The eutectic temperature for this system is 2,400° C. Accordingly, dead-burned or sintered dolomitic refractories prepared by high temperature calcination and sintering of dolomitic ores are used extensively in the steel industry for the repair of the hearth linings of basic electric and open-hearth furnaces.

In addition, such refractories often comprise the working linings of converters in the oxygen conversion process for the production of steel. Dolomithic refractories are also widely utilized in the lining of rotary Dolomitic for the rock products industry.

Despite the high melting point of the CaO · MgO mixture present in dolomitic refractories, their use has been limited by the tendency of the oxides, especially lime, to revert to the hydroxide or carbonate form upon exposure to moisture or carbon dioxide in the atmosphere.

Various attempts have been made to improve the hydration resistance of dolomitic refractories. The use of certain additives in relatively large amounts (for example, over 1 percent by weight) such as clay, silica, iron oxide and other fluxing agents have been proposed to improve their hydration resistance. However, the presence of such fluxing agents in quantities over 1 percent by weight has a deleterious effect on the refractoriness and particularly the density of the resulting product. Consequently, flux-containing dolomitic refractories are often inadequate to meet the demands of present day steel making processes especially the oxygen conversion process which uses relatively higher temperatures to obtain greater melting and refining rates.

Another technique heretofore used for the preparation of dolomitic refractories has involved admixing dolomite with pieces of coke and sintering the mixtures in shaft kilns. The combustion of the coke furnishes the heat necessary for sintering. Unfortunately, the residual ash from the coke adds to the impurities in the final dead-burned product. Consequently, as in the addition of fluxing agents, the products produced by this process possess a lowered refractoriness.

Accordingly, the search has been continued to find processes which produce dolomitic refractories with improved hydration properties without adversely affecting refractory properties. Thus, it has been proposed to calcine dolomite to produce dolomitic quicklime, an intimate admixture of calcium oxide and magnesium oxide. Thereafter, the quicklime is hydrated under pressure until the calcium and magnesium contents are fully hydrated. The fully hydrated quicklime is formed into a suitable refractory shape and sintered or dead-burned until the desired refractory article is obtained.

This process makes it possible to prepare dolomitic refractories without the addition of fluxing agents. However, the dolomite must be fully hydrated and such hydration requires the use of pressure. As a consequence, this process requires the use of special equipment and procedures, such as autoclaving, which are expensive and time consuming, and render the economics of the process unfavorable. Further, the dead-burned dolomitic refractories obtained after fully hydrating the quicklime generally lack sufficient density and hydration stability to be used effectively.

It has also been proposed to add lime or a low purity dolomite to magnesium hydroxide and then burn this mixture to produce a synthetic clinker. Generally, it has been difficult to produce refractory materials having a desirable low porosity from synthetic clinker produced by this method. Further, unless high burning temperatures are provided for bricks formed of such clinker, the hot modulus of rupture would tend to be undesirably low.

One approach to stabilization of dolomitic refractories which has proved beneficial is to produce a dense, high-purity dolomite grain having a low surface area. This low surface area makes the kinetics of the reaction converting CaO to the hydroxide or carbonate form much less favorable. Such a process is described in application Ser. No. 28,040, filed Apr. 13, 1970 by the assignee of this application, now U.S. Pat. No. 3,698,922. The method there disclosed is very desirable because no fluxing ingredients are added, and the refractory material retains excellent high temperature characteristics. This process yields a product which is still subject to hydration, but the high density of the product increases its useful shelf life by decreasing the rate at which the oxides are hydrated.

The present invention provides an improvement in a process of producing hydration resistant, low flux dolomitic refractory material in which a dolomite containing at least 98 percent by weight of CaO and MgO is calcined to produce quicklime, the quicklime is slaked to at least partially hydrate the oxides, and the slaked oxides are formed into a refractory shape and then sintered. The improvement comprises incorporating in the slaked oxides at least 0.01 percent by weight on an oxide basis of a finely divided stabilizing agent such as $Al_2O_3$, $V_2O_5$, aluminum fluoride, $MgF_2$, and $CaF_2$, and mixtures thereof to increase the total content of said agents to from 0.01 to about 1.0 percent by weight on an oxide basis.

It is surprising that the addition of such small amounts of stabilizing agents will produce significant changes in the hydration resistance of high purity CaO · MgO refractory grains. Besides increasing the hydration resistance of low flux CaO · MgO grain, small additions of the stabilizing agent also tend to greatly improve the appearance of the product. Samples of dolomite grain (CaO · MgO) ordinarily appear non-homogeneous and display a mottled beige color. A small addition of $Al_2O_3$, for example, which still yields a material greater than 99 percent CaO · Mgo produces a very homogeneous, almost white sample with no detectable second phase formation.

The addition of small amounts, less than 1 percent by weight, of the stabilizing agents does not significantly lower the refractory properties of the resulting grain, in contrast to the results obtained when higher percentages of traditional fluxing agents are added to dolomite compositions.

The invention resides in the novel processes and improvements shown and described. Both the foregoing general description and the following detailed description are exemplary and explanatory, and should not be considered to restrict the scope of the invention.

Dolomitic refractories can be produced according to the present invention from most light burned, domestic, commercially available, low-flux dolomite rock compositions, that is, compositions containing at least about 98 percent by weight of Ca and Mg on an oxide basis. It is preferable, however, to employ a high purity dolomite rock, i.e., one comprising at least 99 percent CaO and MgO. Such high purity dolomite rock provides products having greater refractoriness than rock containing a higher percentage of impurities.

The dolomite ore utilized in the process of the invention is in a light burned condition. Light burning is accomplished by calcination of the dolomite at temperatures in the range of about 1,000° to 1,400° C. The time required for light burning will vary with the temperature used, and will ordinarily be in the range of about one-half to 2 hours. Light burning converts the carbonate in the dolomite to the oxide form, but does not cause the dolomite to agglomerate into large clumps.

Any suitable kiln, typically, a shaft or rotary kiln, can be utilized for light burning the dolomite. The fuel used in the kiln should be one that does not introduce excessive amounts of impurities into the calcined product. With rotary kilns, coals of moderate of low ash content, and gas or fuel oil are most effectively utilized. One type of shaft kiln, shown as an Arnold kiln, is heated by means of coal-fired Dutch ovens opening into the lower part of the kiln. On the other hand, Azbe type shaft kilns are preferably fired with produced or natural gas.

The size of the dolomite stone to be calcined is selected on the basis of the particular kiln being utilized, with the most efficient and economical use of the kiln being the prime criteria, rather than any special process techniques.

As is well known, calcination of the raw dolomite stone produces a mixture of oxides, predominantly CaO and MgO and popularly termed quicklime. The quicklime is slaked with water until it is at least partially hydrated. As used in the specification and claims, the term "partially hydrated" means that the quicklime has been converted to a mixture comprising calcium hydroxide, magnesium hydroxide and magnesium oxide. Specifically, the term "partially hydrated quicklime" as used herein refers to compositions comprising from about 3 to 40 percent, and preferably from 5 to about 20 percent by weight magnesium oxide (on an oxide basis). The balance of the partially hydrated quicklime is a combination of calcium hydroxide and magnesium hydroxide.

The quicklime is preferably partially hydrated by slaking the calcined dolomite in water at atmospheric pressure. At least 80 parts by weight of water are added for each 100 parts by weight of dolomite in this slaking step. Preferably, from 100 to 150 parts of water are added per 100 parts of dolomite.

The calcined dolomite may also be fully hydrated by autoclaving under pressure.

The preferred partial hydration of the quicklime is ordinarily completed in about one-fourth to 72 hours, depending on the particle size of the mixed oxides, and the calcination temperature achieved, and can be accomplished, for example, by placing the calcined dolomite and water in a pug mill. Preferably, the desired degree of hydration is achieved in about one-half to 10 hours. Achievement of the desired level of hydration can be determined by routine chemical analysis.

In accordance with the invention, at least 0.01 percent by weight on an oxide basis of a finely divided stabilizing agent selected from the group consisting of $Al_2O_3$, $V_2O_5$, aluminum fluoride, $MgF_2$, and $CaF_2$, and mixtures thereof is added to the slaked oxide to increase the total content of stabilizing agent in the slaked oxide to from 0.1 to about 1.0 percent by weight on an oxide basis.

It has been found that the exact desired weight percent of stabilizing agent present in the slaked oxide varies with the stabilizing agent selected. From 0.25 to 1 percent of finely divided $Al_2O_3$ is desirably present in the material to be sintered. From 0.01 – 1.0 percent of $V_2O_5$, aluminum fluoride, $MgF_2$, or $CaF_2$ can be present in the material to be sintered. These stabilizing agents are preferably present in amounts of from 0.1 – 0.5 percent by weight.

The stabilizing agent has a particle size distribution such that at least 100 percent by weight passes a 200 mesh screen and in preferred embodiments all the stabilizing agent passes a 325 mesh screen. This small particle size distribution is important to insure that the stabilizing agent is uniformly distributed throughout the sintered grain produced in accordance with the invention. The sintering step, of course, tends to drive off fluorine, and fluorine has not been detected in the sintered product.

It has also not been possible to detect in the sintered refractory grain the presence, in a separate phase, of the $Al_2O_3$ or $V_2O_5$ stabilizing agents after they are incorporated in accordance with the present invention.

Preferably, the stabilizing agent is incorporated in the slaked oxides as an aqueous slurry. This procedure for incorporating the stabilizing agent is preferred because more intimate mixing is achieved in slurry form. cases, After the addition of the stabilizing agent, as set forth above, the resulting admixture is formed into a refractory shape suitable for sintering (dead burning) and is usually subsequently dried. In some cases a separate drying step is omitted and the small amount of drying necessary to provide abrasion resistance during firing is accomplished during the heating stage of the firing step.

The admixture may be nodulized, extruded, or pressed into pellets or briquettes. The forming step generally involves a compaction or pressing operation utilizing conventional equipment capable of supplying sufficient pressure to give a coherent, dense refractory shape. Either hydraulically or mechanically actuated presses can be used. Pressures in the range of about 4,500 to 10,000 psi have been found to be satisfactory, although higher pressures ranging up to approximately 30,000 psi can be utilized. In some instances, the higher pressures are preferable in order to obtain stronger refractory shapes possessing better resistance to abrasion during handling. Generally, it is desirable that the water content of the admixture be such that the material shows a weight loss on drying of about 0–10 percent and preferably 4–8 percent by weight.

It is possible to combine the drying and shaping steps of the present process by extruding or nodulizing or a chain dryer.

The formed refractory shapes can be stored or immediately burned or sintered. It has been found that the refractory shapes tend to harden because of the formation of a carbonate skin and become more abrasion resistant if they are permitted to dry for approximately 24 hours after forming and before sintering.

To achieve the desired refractory properties, the dolomitic material of this invention, containing an added stabilizing agent, is sintered or dead-burned. Sintering or dead-burning of the formed refractory is accomplished in any suitable rotary or shaft kiln which is capable of supplying the desired high temperatures. The fuel utilized for firing the kiln may be natural gas, fuel oil, powdered coal or any other acceptable fuel. The use of natural gas or fuel oil is preferred since these fuels, unlike coal, do not introduce additional impurities into the product.

The dead-burning or sintering time varies, of course, with the temperature utilized. As might be expected, less sintering time is necessary at higher temperatures. For example, it has been found that exposure of a refractory shape for approximately 20 to 25 minutes at about 1,700° C produces a sintered dolomitic refractory possessing relatively high density. Generally, the sintering temperature will be in the range of about 1,300° to 1,800° C and preferably 1,500° to 1,700° C.

After sinterng, the refractory product can be directly used or it can be pressed with pitch into brick shapes and tempered by conventional means. Most often, the dolomitic refractory grains are coated with pitch before they are pressed into a final shape. Of course, the sintered refractory product can also be pressed into a suitable brick shape and then fired conventionally.

The incorporation of stabilizing agents in accordance with the invention can be used to improve the hydration resistance of natural dolomitic ores, and can also be used to improve the hydration resistance of admixtures of a dolomite ore with a magnesium compound that will decompose to form MgO, or light burned MgO. The incorporation of additional magnesium in dolomite ores is disclosed in United States patent application 129,205, filed Mar. 29, 1971, and assigned to the assignee of this application. The disclosure of application Ser. No. 129,205 is incorporated herein by reference. Thus, the dolomite grain produced in accordance with the invention, can contain from about 40–98 percent MgO, and from about 1–58 percent CaO.

The density of the material produced in accordance with the present invention is very high, above about 3.3 g/c.c. after sintering. The porosity of the material is very low.

For a better understanding of the invention, the following examples are provided. These examples are intended to be illustrative, and should not be construed as limiting the invention. All parts and percentages listed in the specification and claims are by weight unless otherwise noted, and all screen sizes are U.S. Sieve Series unless otherwise noted.

EXAMPLES 1–15

Samples of Niagran dolomite of above 99.2 percent by weight CaO · MgO are calcined at 1,000°, 1,200°, and 1,400° C for 2 hours and then slaked in water. The slaked material is dried and pressed into disks at 10,000 psi with 10 percent water as a binder and fired at from 1,400° to 1,700° C for 2 hours. The resulting densities and porosities are given in Table I.

Table I also lists the condition of the samples which have been kept in a closed vessel over water for 24 and 29 days in a room kept at 72° F. Samples final fired at 1,600° C for 2 hours are still intact after 24 days in the humidity chamber. The surfaces of all samples exhibited slight dusting.

An x-ray analysis showed that the dolomite initially calcined at 1,000° C and slaked in water consisted of essentially all $Ca(OH)_2$ and $Mg(OH)_2$. That is, it was fully hydrated. The material calcined at 1,200° C and then slaked contained MgO, $Mg(OH)_2$, and $Ca(OH)_2$. The material calcined at 1,400° C and then slaked had a larger amount of MgO present than the material calcined at 1,200° C, along with $Ca(OH)_2$ and $Mg(OH)_2$.

A chemical analysis of the materials after slaking is listed in Table II.

As seen in Table I, the hydration resistance follows the $Al_2O_3$ content. That is, the samples with the higher $Al_2O_3$ content seem to have the better hydration resistance.

In the procedure of Examples 13–15, varying amounts of $Al_2O_3$ in excess of 0.25 percent by weight are added as an aqueous slurry to the dolomite compositions of Example 7 during the slaking step. Otherwise the procedures of Example 7 are followed.

As seen in Table III, additions of $Al_2O_3$ to the compositions improved the hydration resistance of the products of Examples 13–15 although the density decreased slightly. Several samples with increased $Al_2O_3$ contents withstood the hydration chamber for over three months without cracking, and with only very minor surface hydration.

Each of the compositions containing added $Al_2O_3$ can be fired at 1,600° C to produce a dense sample of at least 3.35 g/cc without any cracking.

The small $Al_2O_3$ additions of Examples 13–15 also greatly improved the appearance of the samples. Samples of dolomite grain (CaO · MgO) ordinarily appear non-homogeneous with a mottled beige color. The small additions of $Al_2O_3$ of Examples 13–15, which still yield a material of at least about 99 percent CaO · MgO purity, result in very homogeneous, almost white samples with no detectable $Al_2O_3$ second phase formation.

TABLE I

| Ex. No. | Calcining temp., °C. | Firing temp., °C. | Bulk density, g./cc. | Porosity, percent | Days in humidity chamber | Condition of sample |
|---|---|---|---|---|---|---|
| 1 | 1,000 | 1,400 | 3.23 | 2.5 | 24 | Slight cracking. |
| 2 | 1,000 | 1,500 | 3.38 | 0.131 | 29 | Severely cracked. |
| 3 | 1,000 | 1,600 | 3.36 | 0.05 | 24 | Intact. |
| 4 | 1,000 | 1,700 | 3.35 | 0.02 | 24 | Slight cracking. |
| 5 | 1,200 | 1,400 | 3.32 | 1.3 | 24 | Powder. |
| 6 | 1,200 | 1,500 | 3.38 | 0.04 | 29 | Slight cracking. |
| 7 | 1,200 | 1,600 | 3.39 | 0.05 | 24 | Intact. |
| 8 | 1,200 | 1,700 | 3.39 | 0.05 | 24 | Severely cracked. |
| 9 | 1,400 | 1,400 | 3.37 | 0.1 | 24 | Do. |
| 10 | 1,400 | 1,500 | 3.39 | 0.08 | 29 | Slight cracking. |
| 11 | 1,400 | 1,600 | 3.39 | 0.05 | 24 | Intact. |
| 12 | 1,400 | 1,700 | 3.39 | 0.04 | 24 | Do. |

TABLE II

| | Slaked dolomite −100 mesh fraction 1000° C. calcine (Examples 1-4) percent by weight | Slaked dolomite −100 mesh fraction 1200° C. calcine (Examples 5-8) percent by weight | Slaked dolomite −100 mesh fraction 1400° C. calcine (Examples 9-12) percent by weight |
|---|---|---|---|
| SiO₂ | .108 | .079 | .079 |
| Fe₂O₃ | .108 | .130 | .065 |
| Al₂O₃ | .324 | .238 | .408 |
| CaO | 58.900 | 59.060 | 58.910 |
| MgO | 40.550 | 40.480 | 40.520 |

TABLE III

| Ex. No. | Calcining temp., °C. | Firing temp., °C. | Bulk density, g./cc. | Weight percent of Al₂O₃ addition | Days in humidity chamber | Condition of sample |
|---|---|---|---|---|---|---|
| 13 | 1,200 | 1,600 | 3.38 | 0.3 | 90+ | No cracking. |
| 14 | 1,200 | 1,600 | 3.36 | 0.5 | 90+ | Do. |
| 15 | 1,200 | 1,600 | 3.35 | 1.0 | 90+ | Do. |

EXAMPLES 16–22

In these examples, the hydration resistance of a CaO · MgO refractory grain is improved by addition of magnesium fluoride and vanadium pentoxide.

Samples are prepared containing 0, 0.25, 0.50, and 1.0 weight percent $MgF_2$ additions to a hydroxide base composition containing 60 percent MgO and 40 percent CaO on an oxide basis. The sample containing no additive serves as a control. A second series of samples are prepared containing 0.01, 0.05, 0.10, and 0.50 by weight percent $V_2O_5$ additions to the same base composition. All of the batches are pressed at 15,000 psi and fired to a density greater than 3.3 g/cc with zero water absorption at 1,650° C for two hours.

The fired samples are then placed in a closed vessel over water at 72° F for hydration studies. The control sample with no addition of stabilizing agent exhibited slight cracking after 20 days in the closed vessel. The sample containing 1.0 percent $MgF_2$ cracked after 20 days in the humidity chamber. After 30 days in the chamber, the control sample is still slightly cracked, as are the samples containing 0.01, 0.05, and 0.10 percent $V_2O_5$ and 0.125 and 0.25 percent $MgF_2$. No evidence of dusting is apparent in any of the samples containing the added stabilizing agent.

After 75 days in the chamber: (a) the control sample is destroyed, (b) the sample containing 0.125 percent $MgF_2$ is only slightly cracked and still in one piece and (c) the samples containing 0.01, 0.05, and 0.10 percent $V_2O_5$ are split in several sections, but show no evidence of dusting. The samples with $V_2O_5$ additions of 0.01 and 0.05 percent produced better hydration resistance compared to samples with higher $V_2O_5$ additions. Also, the sample with 0.125 percent $MgF_2$ exhibited better hydration resistance than samples containing larger amounts of $MgF_2$. Each of the samples (Examples 16–22) containing an additive showed significantly improved hydration resistance compared to the control containing no additive.

What is claimed is:

1. An improvement in a process of producing hydration resistant, low flux dolomitic refractory material in which a dolomite containing at least 98 percent by weight of CaO and MgO is calcined to produce quicklime, the quicklime is slaked to partially hydrate the oxides, and the partially hydrated oxides are formed into a refractory shape and then sintered, the improvement comprising; incorporating with the partially hydrated oxides at least 0.01 percent by weight on an oxide basis of a finely divided stabilizing agent selected from the group consisting of $Al_2O_3$, $V_2O_5$, aluminum fluoride, $MgF_2$, and $CaF_2$, and mixtures thereof to increase the total content of said agents to from 0.01 to about 1.0 percent by weight.

2. The process of claim 1 in which from 0.25 to 1.0 percent of finely divided $Al_2O_3$ is incorporated with the slaked oxides.

3. The process of claim 1 in which from 0.01 to 0.5 percent of finely divided $V_2O_5$ is incorporated with the slaked oxides.

4. The process of claim 1 in which from 0.1–1.5 percent of aluminum fluoride is incorporated with the slaked oxides.

5. The process of claim 1 in which from 0.1–0.5 percent of $MgF_2$ is incorporated with the slaked oxides.

6. The process of claim 1 in which from 0.1–0.5 percent of $CaF_2$ is incorporated with the slaked oxides.

7. The process of claim 1 in which the finely divided stabilizing agent has a particle size distribution such that at least 100 percent by weight passes a 200 mesh screen.

8. The process of claim 1 in which the dolomite contains at least 99 percent by weight of CaO and MgO.

9. The process of claim 1 in which the slaked oxides are dried to a moisture content of about 0 to 10 percent by weight prior to being formed into a refractory shape.

10. The process of claim 1 in which the stabilizing agent is incorporated in the slaked oxides as an aqueous slurry.

* * * * *